United States Patent
Hagerman et al.

(10) Patent No.: US 8,428,631 B2
(45) Date of Patent: Apr. 23, 2013

(54) METHOD FOR DETERMINING A SUBSEQUENT TIME INTERVAL RELATIONSHIP, FOR SERVICE REQUEST MESSAGES, FROM A USER EQUIPMENT

(75) Inventors: Bo Hagerman, Tyresö (SE); Fredrik Gunnarsson, Linköping (SE); Henrik Olson, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 528 days.

(21) Appl. No.: 12/666,961

(22) PCT Filed: Oct. 26, 2007

(86) PCT No.: PCT/SE2007/000943
§ 371 (c)(1),
(2), (4) Date: Jan. 29, 2010

(87) PCT Pub. No.: WO2009/005418
PCT Pub. Date: Jan. 8, 2009

(65) Prior Publication Data
US 2011/0021223 A1    Jan. 27, 2011

(30) Foreign Application Priority Data
Jun. 29, 2007 (SE) ..................... 0701589

(51) Int. Cl.
- H04B 7/212 (2006.01)
- H04B 7/216 (2006.01)
- H04B 7/00 (2006.01)
- H04B 1/38 (2006.01)
- H04W 4/00 (2009.01)
- H04J 3/00 (2006.01)

(52) U.S. Cl.
USPC ........... 455/507; 455/561; 370/335; 370/342; 370/328; 370/441; 370/442; 370/337; 370/310

(58) Field of Classification Search .................. 455/561, 455/507; 370/335, 342, 328, 441, 442, 337, 370/310
See application file for complete search history.

(56) References Cited

U.S. PATENT DOCUMENTS

| | | | |
|---|---|---|---|
| 4,635,226 A * | 1/1987 | Takahashi et al. ................. | 365/6 |
| 5,596,439 A | 1/1997 | Dankberg et al. | |
| 5,936,441 A * | 8/1999 | Kurita ........................... | 327/141 |
| 6,771,632 B2 | 8/2004 | Dick et al. | |
| 7,054,396 B2 * | 5/2006 | Shan ............................. | 375/346 |
| 7,269,152 B2 | 9/2007 | Vukovic et al. | |

FOREIGN PATENT DOCUMENTS

| | | |
|---|---|---|
| JP | 11032032 A | 2/1999 |
| JP | 2001251236 A | 9/2001 |

(Continued)

*Primary Examiner* — Bobbak Safaipour
(74) *Attorney, Agent, or Firm* — Coats & Bennett, P.L.L.C.

(57) ABSTRACT

The invention relates to a method in a base station for handling a request from a user equipment for accessing a service in a radio communications network, the method comprising the steps of receiving a first wide time interval (305) of an incoming signal (300) comprising a first signal sent from the user equipment, the first signal extending along a first narrow time interval (310) being a part of the first wide time interval, the first narrow time interval of the first signal being a possible service access request message; searching the first wide time interval (305) and detecting that the first signal is a possible service access request message; and identifying how the first narrow time interval (310) of the first signal relates to the first wide time interval (305). The relationship will be the same for subsequent time intervals of the incoming signal (300).

13 Claims, 4 Drawing Sheets

U.S. PATENT DOCUMENTS

| | | |
|---|---|---|
| 7,398,108 B2 | 7/2008 | Hondo |
| 7,486,717 B2 * | 2/2009 | De Wilde et al. ............. 375/150 |
| 2002/0114297 A1 | 8/2002 | Karna et al. |
| 2004/0005022 A1 * | 1/2004 | Zhu et al. ...................... 375/365 |
| 2005/0174968 A1 | 8/2005 | Kitade et al. |
| 2007/0201537 A1 * | 8/2007 | De Wilde et al. ............. 375/147 |
| 2011/0021223 A1 * | 1/2011 | Hagerman et al. ............ 455/507 |

FOREIGN PATENT DOCUMENTS

| | | |
|---|---|---|
| JP | 2004179887 A | 6/2004 |
| JP | 2004282653 A | 10/2004 |
| JP | 2005198353 A | 7/2005 |
| JP | 2006515497 A | 5/2006 |
| JP | 2006319757 A | 11/2006 |
| JP | 2007097223 A | 4/2007 |
| WO | 98/18280 | 4/1998 |
| WO | 9941845 A1 | 8/1999 |
| WO | 9960729 A1 | 11/1999 |
| WO | 0021320 A1 | 4/2000 |
| WO | 2007/022126 A2 | 2/2007 |
| WO | 2007/068722 A1 | 6/2007 |

* cited by examiner

METHOD FOR DETERMINING A SUBSEQUENT TIME INTERVAL RELATIONSHIP, FOR SERVICE REQUEST MESSAGES, FROM A USER EQUIPMENT

TECHNICAL FIELD

The present invention relates generally to a method in a base station within a radio access network. In particular it relates to the handling of a request from a user equipment for accessing a service in a radio communications network.

BACKGROUND

In a common radio network architecture a user equipment may be a mobile terminal by which a subscriber can access services offered by an operator's core network. A radio access network is the part of the network that is responsible for the radio transmission and control of the radio connection. A radio network subsystem controls a number of base stations in the radio access network. A radio network controller controls radio resources and radio connectivity within a set of cells. The base station handles the radio transmission and reception within one or more cells. A cell covers a geographical area. The radio coverage in a cell is provided by radio base station equipment at the base station site. Each cell is identified by a unique identity, which is broadcast in the cell. There may be more than one cell covering the same geographical area. A radio link is a representation of the communication between a user equipment and one cell in the radio access network. Iub/Iur interfaces are interfaces connecting the different nodes in the radio access network. The Iub interface interconnects the radio network controller to the base station. The Iur interface provides interconnection between one radio network controller and another. User data is transported on so-called transport bearers on these interfaces. Dependant on the transport network used, these transport bearers may e.g. be mapped to ATM Adaptation Layer type 2 (AAL2) connections in case of an Asynchronous Transfer Mode (ATM) based transport network or User Datagram Protocol (UDP) connections in case of an Internet Protocol IP based transport network.

A user equipment in an idle state monitors system information of base stations within range, to inform itself about candidate base stations in the service area etc. When a user equipment needs access to services, it sends a request over the Random Access CHannels (RACH) to a radio network controller via the most suitable base station, typically the one with the most favourable radio conditions. This is performed in two steps, first a preamble of the request is sent and when acknowledged by the base station, the request message is sent. Since the uplink propagation of the RACH is only approximately known, the user equipment gradually increases the transmission power of a preamble until either it has been acknowledged via the Acquisition channel (AICH), or the maximum number of attempts has been reached. The preamble and the request message are sent via the base station to the radio network controller. Upon acknowledgement, the RACH request message is sent. After admission control, the radio network controller initiates the connection via the most suitable base station if there are available resources. Uplink coverage is thus a necessity in order to successfully complete random access. The downlink AICH is commonly divided into downlink access slots, and each access slot is of length 5120 chips. Similarly, the uplink PRACH is divided into uplink access slots, each access slot is of length 5120 chips. Uplink access slot number n is transmitted from the user equipment $\tau_{p-a}$ chips prior to the reception of downlink access slot number n, n=0, 1, . . . , 14.

Transmission of downlink acquisition indicators may only start at the beginning of a downlink access slot. Similarly, transmission of uplink RACH preambles and RACH message parts may only start at the beginning of an uplink access slot.

Figure 1:
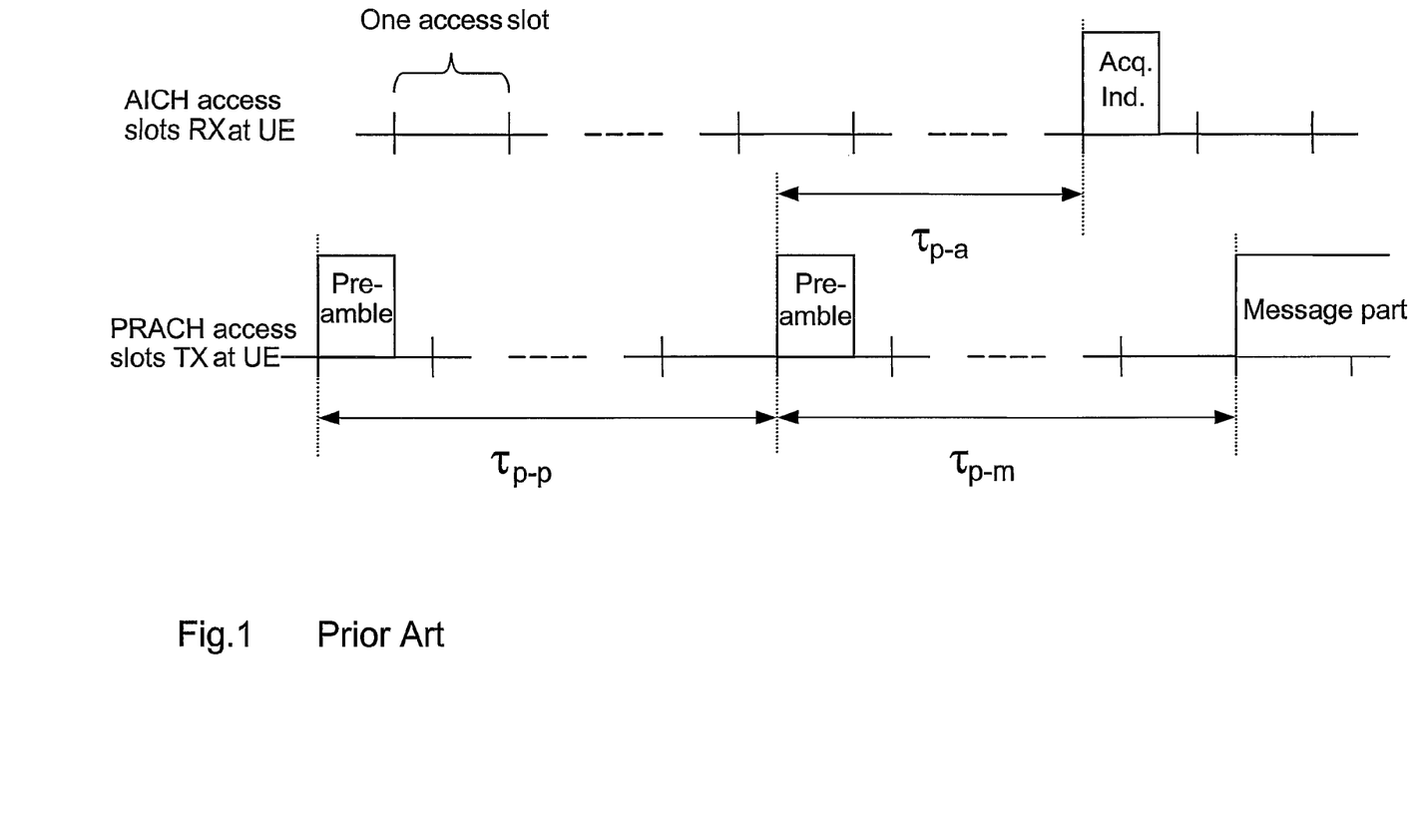
FIG. 1 is a schematic block diagram illustrating prior art is a schematic block diagram illustrating embodiments of a radio access network.

FIG. 1 depicts the timing relation between physical RACH and AICH as seen at the user equipment according to prior art.

The preamble-to-preamble timing distance $\tau_{p-p}$ shall be larger than or equal to the minimum preamble-to-preamble.

$$\tau_{p-p,min}, \text{ i.e. } \tau_{p-p} \geq \tau_{p-p,min}.$$

In addition to $\tau_{p-p,min}$, the preamble-to-Acquisition distance $\tau_{p-a}$ and preamble-to-message distance $\tau_{p-m}$ may be defined as follows:

when AICH Transmission Timing is set to 0, then $\tau_{p-p,min}$=15360 chips(3 access slots)

$\tau_{p-a}$=7680 chips $\tau_{p-m}$=15360 chips(3 access slots)

when AICH Transmission Timing is set to 1, then $\tau_{p-p,min}$=20480 chips(4 access slots)

$\tau_{p-a}$=12800 chips $\tau_{p-m}$=20480 chips(4 access slots)

The parameter AICH Transmission Timing is signalled by higher layers.

The preamble is detected using energy detection relative a preamble threshold, which may be configured from the radio network controller to the base station over Node B Application Part (NBAP). A too low threshold would mistakenly trigger preambles from thermal noise, interference by others and similarly, a too high threshold will trigger preambles at very high power levels, or miss preambles all together. The threshold needs to be set considering the worst case uplink load situation.

Uplink Radio Resource Management (RRM)

The radio network controller may control resources and user mobility such as in 3GPP release 99. Resource control in this framework means admission control, congestion control, channel switching (roughly changing the data rate of a connection). Furthermore, a dedicated connection is carried over a Dedicated CHannel (DCH), which is realized as a DPCCH (Dedicated Physical Control Channel) and a DPDCH (Dedicated Physical Data Channel).

The trend is to decentralize decision making, and in particular the control over the short term data rate of the user connection. The uplink data may then be allocated to a Enhanced DCH (E-DCH), which is realized as the triplet: a DPCCH, which is continuous, an Enhanced DPCCH (E-DPCCH) for data control and an Enhanced DPDCH (E-DPDCH) for data. The two latter are only transmitted when there is uplink data to send. Hence the base station uplink scheduler determines which transport formats each user can use over E-DPDCH. The radio network controller is however still responsible for admission control. In the Wideband Code Division Multiple Access (WCDMA) uplink, there is a trade-off between coverage and enabled peak rates. This is even more emphasized with enhanced uplink, which supports higher bit rates than ordinary dedicated channels. The uplink resources are limited by the thermal noise and interference, i.e. rise over thermal (RoT) that the cell can tolerate. The RoT limit is either motivated by coverage requirements or power control stability requirements. When only one user is connected in the cell, both power control stability and coverage are minor issues, since the uplink interference is likely to be dominated by the power generated by this user. In such a case it is tempting to allow a high RoT in order to allow high signal level over the noise (Ec/Io), which enables the use of high uplink bit rates. Conversely, in order to use the high uplink bit rates, the user connections have to provide high Ec/Io, which implies high RoT.

Cells operating at high RoT will have limited coverage, and it might be impossible to successfully complete random access from some parts of the service areas. The RACH preamble will not be detected by the system at these high RoT when sent from parts of the service area. Furthermore, the gradual power increase may generate significant interference, which could have a negative impact on the data rate of the active user. Neither is it possible to lower the preamble threshold because:

This will lead to many erroneous preamble detections from only thermal noise, which will give unnecessary Iub transmissions of subsequent RACH messages.

This will in many cases result in subsequent RACH transmissions at too low power levels, which will not be decoded correctly.

Moreover, the short time between a received preamble and when an acquisition indicator is expected means that it is very limited time for processing before it has to be determined whether a preamble was sent at a sufficient power level.

SUMMARY

It is therefore an object of the present invention to provide a mechanism that improves the handling of a request from a user equipment for accessing a service in a radio communications network.

According to a first aspect of the present invention, the object is achieved by a method in a base station 100 for handling a request from a first user equipment for accessing a service in a radio communications network. The method comprises the step of receiving a first wide time interval of an incoming signal. The incoming signal comprises a first signal sent from the first user equipment. The first signal extends along a first narrow time interval being a part of the first wide time interval. The first narrow time interval of the first signal is a possible service access request message or preamble thereof. The method comprises the further step of analysing the incoming signal by searching the first wide time interval. In the analysis it is detected that the first signal is a possible service access request message or preamble thereof. The method comprises the further step of identifying how the first narrow time interval of the first signal relates to the first wide time interval. The relationship will be the same for subsequent time intervals of the incoming signal comprising the first signal from the first user equipment.

According to a second aspect of the present invention, the object is achieved by an arrangement in a base station for handling a request from a first user equipment for accessing a service in a radio communications network. The base station arrangement comprises a receiving unit adapted to receive a first wide time interval of an incoming signal. The incoming signal comprises a first signal sent from the first user equipment. The first signal extends along a first narrow time interval is a part of the first wide time interval. The first signal is a possible service access request message.

The base station arrangement further comprises a processing unit comprising an analysing unit adapted to analyse the incoming signal by searching the first wide time interval. The analysing unit is further adapted to detect the first signal as being a possible service access request message. The processing unit further comprises an identification unit being adapted to identify how the first narrow time interval relates to the first wide time interval, which relationship will be the same for subsequent time intervals of the incoming signal comprising the first signal from the first user equipment.

An advantage with the present invention is that the prediction of subsequent narrow time intervals to be searched instead of searching wide time intervals, makes it possible to adopt more advanced detection mechanisms, which are intractable for wide time interval searches, which implies that the handling of a request from a user equipment for accessing a service in a radio communications network is improved. Furthermore, it avoids false detections to a large extent, since more advanced detectors are used where preambles are probable.

Another important advantage is that the erroneous RACH messages sent in vain over Iub can be reduced to a minimum, since the preamble false detections are reduced to a minimum.

Improved random access including interference cancellation enables the operation at higher RoT, which in turn enables the use of higher uplink data rates.

DETAILED DESCRIPTION

The invention is defined as a method and an arrangement which may be put into practice in the embodiments described below.

Figure 2:
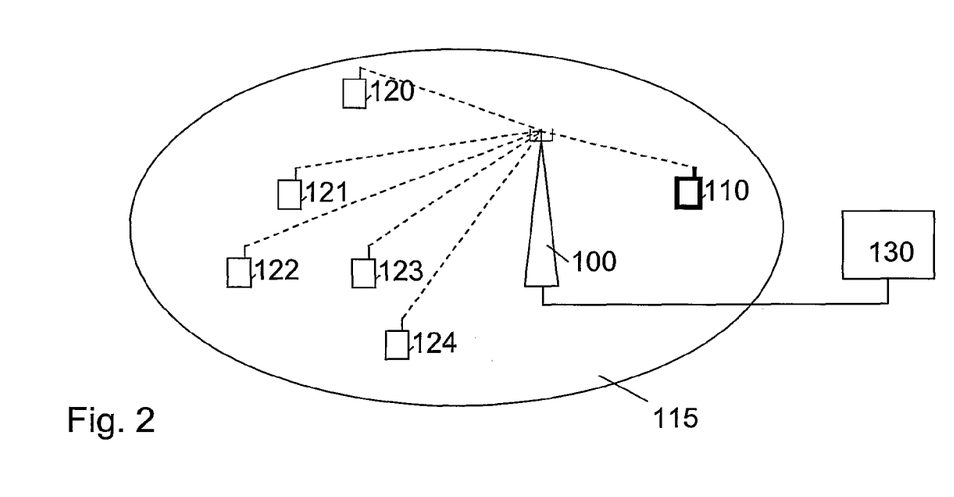

FIG. 2 depicts a base station 100 and a first user equipment 110 in a radio access network being comprised in a radio communications network. The radio access network is any network using access protocol, i.e. radio access networks using technologies such as e.g. E-UTRA, Worldwide Interoperability for Microwave Access (WiMAX), UTRAN, WCDMA, GSM/GPRS, Frequency Division Duplex (FDD), Orthogonal Frequency-Division Multiplexing (OFDM), Third Generation Partnership Project (3GPP) Long Term Evolution (LTE) etc. The base station 100 may be any suitable radio base station that can communicate with user equipments using radio communication, such as e.g. an eNode-B or Node-B. The first user equipment 110 is located within a cell 115 being served by the base station 100. The base station 100 communicates with at least one second user equipment over a radio link, in the example depicted in FIG. 2, the base station 100 communicates with five second user equipments 120, 121, 122, 123 and 124. The first user equipment 110 and the second user equipments 120, 121, 122, 123 and 124 may be any suitable radio communication device such as a laptop, a computer, a mobile phone, a Personal Digital Computer (PDA), or any other radio communication device that can communicate with base stations using radio communication. The at least one second user equipments 120, 121, 122, 123 and 124 are also located within the cell 115, served by the base station 100.

In order to allow high bit rates and operating at high rise over thermal levels, the coverage needs to be ensured. One important component is therefore to ensure that the random access can be successfully completed in the entire service area.

In some embodiments, when the first user equipment 110 wishes to access a service in the radio communications network, it first sends a service access request message such as e.g. a RACH preamble, over a random access channel such as e.g. RACH, via the base station 100 to a radio network controller 130 associated to the base station 100. The service request message may e.g. be sent in one or more parts, such as e.g. first a preamble of the service request message and when acknowledged, the service request message, or e.g. a first part of the service request message followed by a second part of service request message, etc. Since the uplink propagation of the random access channel is only approximately known, the first user equipment 110 attempts sending the service request message or the preamble of it and gradually increases the transmission power of the preamble for each attempt until either it has been acknowledged via an acquisition channel such as e.g. AICH, or a predetermined maximum number of attempts have been reached. When the first user equipment 110 has received an acknowledgement that the preamble is detected, it stops the attempts of sending the service request message or preamble thereof. The first user equipment 110 then may send the service access request message if the first message was a preamble, such as e.g. a RACH message via the base station 100 to the radio network controller 130. The further attempts to send service request messages or preambles of it are sent in subsequent time intervals.

The receiver in the base station 100 is advanced and supports advanced receiver schemes such as e.g. interference cancellation. The receiver implementation may divide up the user handling to several boards, or confined units. According to the present solution a random access burst of attempts of sending the preamble from the first user equipment 110 is possible to detect despite extensive dedicated channel interference from the second user equipments 120, 121, 122, 123 and 124.

The first user equipment 110 sends a first attempt of a service access request message or preamble thereof, on a random access channel. The service access request message or preamble thereof is from now on called the message. The second user equipments 120, 121, 122, 123 and 124 communicates with the base station 100, each of them sending a signal to the base station on dedicated channels. The base station 100 receives an incoming signal 300 depicted in FIG. 3. The incoming signal comprises a first signal received from the first user equipment 110 and a second signal received from the at least one second user equipments 120, 121, 122, 123, 124. I.e. the second signal comprises all the signals from the respective second user equipments 120, 121, 122, 123, 124. The incoming signal is divided into time intervals. First, the base station 100 receives a first wide time interval 305 of the incoming signal.

Figure 3:
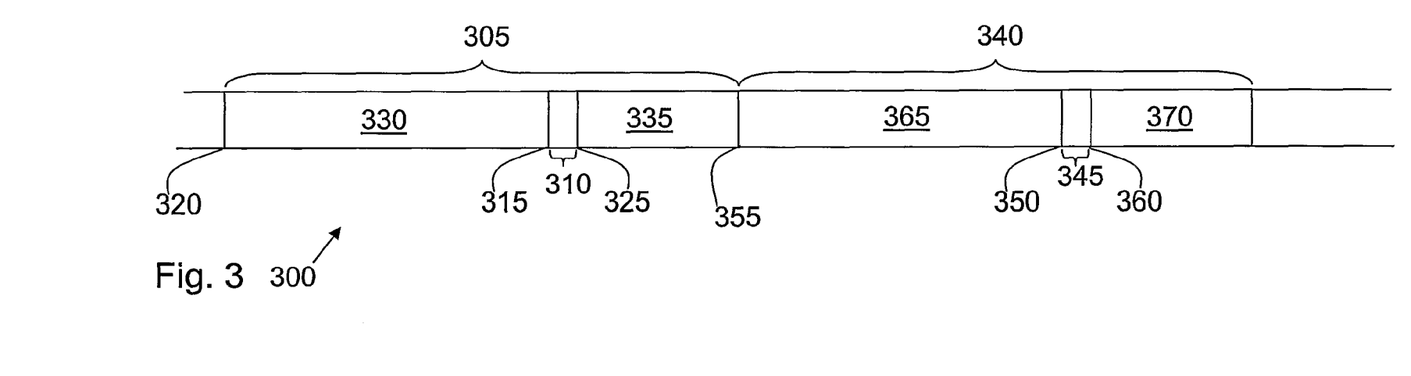
FIG. 3 is a flowchart illustrating embodiments of method steps.

The first signal sent by the first user equipment 110 extends along a first narrow time interval 310 being a part of the first wide time interval 305. The first narrow time interval 310 starts at a specific first time 315 after the starting point 320 of the first wide time interval 305. The first narrow time interval 310 ends at a specific second time 325 after the starting point 320 of the first wide time interval 305. The first narrow time interval of the first signal comprises the first attempt of the message of the first user equipment 105. The spare time 330 and 335 of the first wide time interval 305 comprises the second signals, which in turn comprises all the signals from the second user equipments 120, 121, 122, 123, 124.

In some embodiments a delay of the first wide time interval 305 of the incoming signal is made.

During the delay, the first wide time interval 305 is in some embodiments searched to identify the second signal comprised in the incoming signal, i.e. all the signals from the second user equipments 120, 121, 122, 123, 124.

In some embodiments and still during the delay, all, some or at least one of the identified signals from the second user equipments 120, 121, 122, 123, 124 are washed or mitigated away from the incoming signal. This is an advantage since it cancels interference caused by the second user equipments 120, 121, 122, 123, 124. After interference cancellation, it is more probable to detect the service request messages or preambles of it sent from the first user equipment 110.

The incoming signal is analysed by searching the first wide time interval 305. In the embodiments where the incoming signal is washed or mitigated, the analysis is performed on the washed or mitigated incoming signal. By means of the analysis, it is detected that the first signal is a possible service access request message or preamble of it.

The base station 100 may send an acknowledgement that the service request message or the preamble of it is detected to the first user equipment 110. However, it will be too late for sending the acknowledgement in time for the first user equipment 110 stopping the sending attempts of the service access request message in the in the subsequent time interval. This means that the first user equipment 110 will make at least one further attempt to send the service request message.

The first wide time interval 305 of the incoming signal after interference cancellation is used to accurately predict the narrow time interval 310 of the signal sent from the first user equipment 110 within wide time interval of the incoming signal. This means that it is identified how the first narrow time interval 310 of the first signal relates to the first wide time interval 305. This may be performed by identifying when the first narrow time interval 310 starts 315 and ends 325 in relation to the starting point 320 of the first wide time interval 305 or by identifying when the first narrow time interval 310 starts 315 in relation to the starting point 320 of the first wide time interval 305 and how long time it lasts.

The relationship will be similar due to potential mobility of the user the same or for subsequent time intervals of the incoming signal comprising the first signal from the first user equipment 110 and may be used when the subsequent attempt of the service request message is received from the same user equipment 110.

The first user equipment 110 sends a subsequent second attempt of the service access request message or preamble thereof, e.g. on a random access channel. Some or all of the second user equipments 120, 121, 122, 123 and 124 may still communicate with the base station 100 and some further second user equipments may have started to communicate with the base station 100, each of them sending signals to the base station 100 on dedicated channels. The base station 100 receives a subsequent second wide time interval 340 of the incoming signal. In FIG. 3, the subsequent second wide time interval 340 follows directly after the first wide time interval 305. However there may in some embodiments be a time interval in between the first wide time interval 305 and the subsequent second wide time interval 340.

The first signal sent by the first user equipment 105 and being received by the base station, now extends along a second narrow time interval 345 being a part of the second wide time interval 340. The second narrow time interval 345 starts at a specific first time 350 after the starting point 355 of the second wide time interval 340. The first narrow time interval 345 ends at a specific second time 360 after the starting point 355 of the first wide time interval 305. The second narrow time interval 345 of the first signal comprises the second attempt of the message of the first user equipment 105. The spare time 365 and 370 of the second wide time interval 345 comprises the second signals, which in turn comprises all the signals from the second user equipments e.g. 120, 121, 122, 123, 124.

The second narrow time interval 345 of the first signal relates to the second wide time interval 340 in the same way as the first narrow time interval 310 of the first signal relates to the first wide time interval 305. This means that the second narrow time interval 345 has the same length as the first narrow time interval 310 and the specific time from the starting point 355 of the second wide time interval 345 to the starting point 350 of the second narrow time interval 345 is the same as for the specific time from the starting point 320 of the first wide time interval 305 to the starting point 315 of the first narrow time interval 310. The relationship will be the same for subsequent time intervals of the incoming signal comprising the first signal from the first user equipment 110 and may be used when the subsequent attempt of the service request message is received from the same user equipment 110.

When the second time interval 340 of the incoming signal 300 is received, the second narrow time interval 345 is found by using the identified knowledge of the relationship between the wide time interval and the narrow time interval in subsequent time intervals of the incoming signal comprising the first signal from the first user equipment 110. When the second time interval 340 is found, the incoming signal is analysed by the base station 100, by searching the second narrow time interval 345. The second narrow time interval 345 comprises the subsequent second attempt of the service access request message or preamble thereof.

When the subsequent service request message is received, more advanced processing may be adopted within the predicted and narrower time interval search together with a more aggressive, i.e. lower, preamble or service request message detection threshold. In combination, it may be motivated to use a more conservative preamble detection threshold for the wide random access search time interval for the initial user equipment 110 transmissions.

Figure 4:
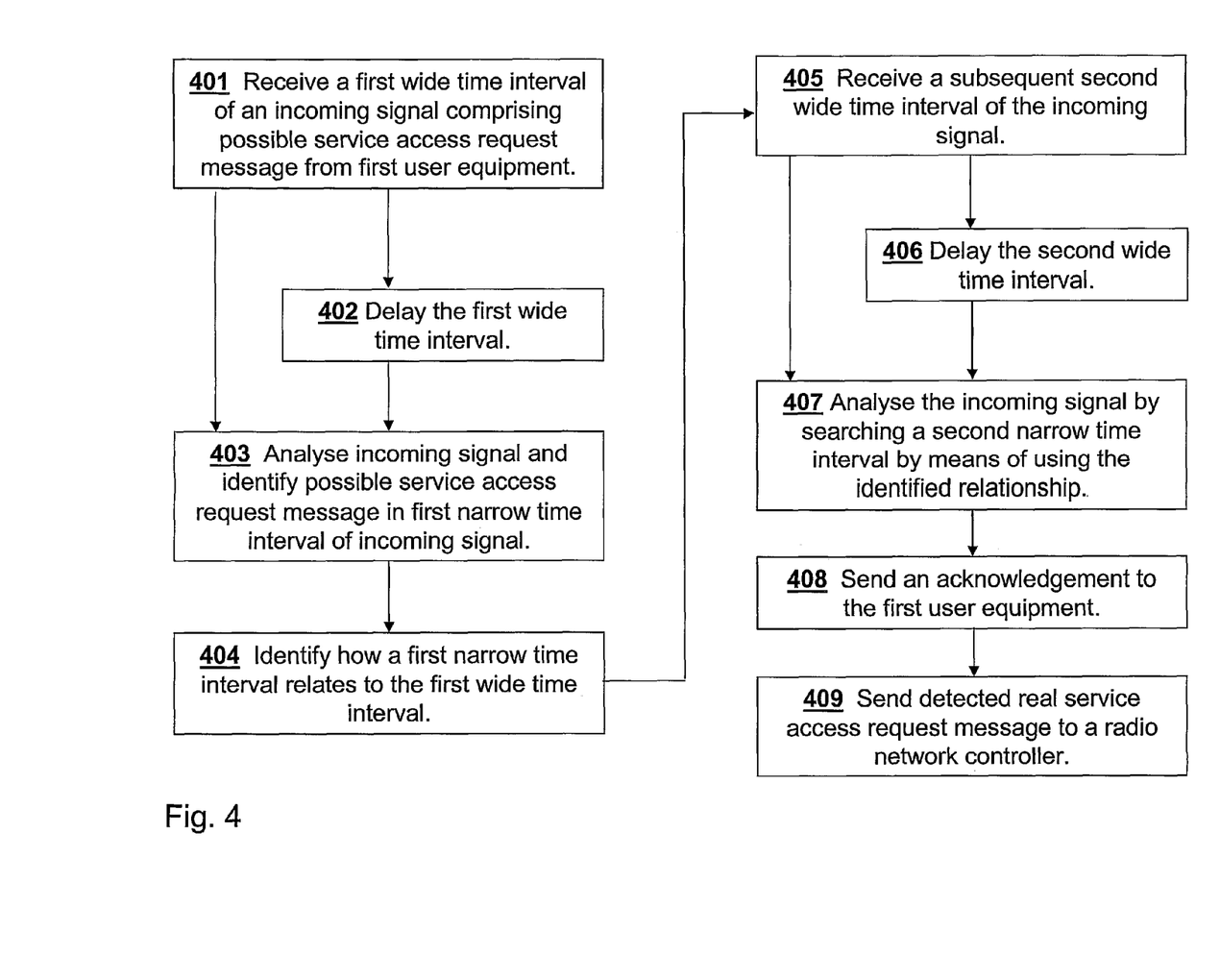
FIG. 4 is a schematic block diagram illustrating embodiments of a signal.

FIG. 4 is a flowchart depicting embodiments of the method in the base station 100 for handling a request from a first user equipment 110 for accessing a service in a radio communications network. The method may comprise the following steps:

401. A first wide time interval 305 of an incoming signal 300 is received in the base station 100. The incoming signal 300 comprises a first signal sent from the first user equipment 110 and in some embodiments the incoming signal 300 further comprises a second signal sent from the one or more second user equipments 120, 121, 122, 123, 124. The first signal extends along a first narrow time interval 310 being a part of the first wide time interval 305. The first signal is a possible service access request message or preamble thereof, a first part of it, or the complete message.

402. In some embodiments, a delay is made of the first wide time interval 305 of the incoming signal. The second signal or part of it comprised in the incoming signal, is identified during this delay. In some embodiments the identified second signal or part of it is washed or mitigated away from the incoming signal 300 during the delay. This is also called cancellation.

403. The incoming signal 300 is analysed by searching the first wide time interval 305. In the embodiments wherein the incoming signal 300 is washed or mitigated, the analysis is performed by searching the first wide time interval 305 of the washed or mitigated incoming signal 300. In this analysis, the first signal is in some embodiments detected as being a possible service access request message or preamble thereof. The first signal of the user equipment 110 has a specific energy. In some embodiments the first signal is detected as being a possible service access request message or preamble thereof when the specific energy exceeds a predetermined first threshold value, when searching the first wide time interval 305.

404. The base station 100 identifies how the first narrow time interval 310 relates to the first wide time interval 305. This relationship will be the same for subsequent time intervals of the incoming signal 300 comprising the first signal from the first user equipment 110.

405. In some embodiments, the base station 100 receives a subsequent second wide time interval 340 of the incoming signal 300. The first signal comprised in the incoming signal 300 extends along a second narrow time interval 345 that is a part of the second wide time interval 340 and is a possible service access request message or preamble thereof sent again as a new attempt from the user equipment 110.

406. In some embodiments, a delay is made of the second wide time interval 340 of the incoming signal. The second signal or part of it comprised in the incoming signal is identified during this delay. In some embodiments the identified second signal or part of it is washed or mitigated away from the incoming signal 300 during the delay.

407. The incoming signal 300 may be analysed by searching the second narrow time interval 345. In some embodiments the analysis is performed by searching the second wide time interval 305 when the incoming signal 300 is washed or mitigated. The second narrow time interval 345 is found by using the, in step 406, identified knowledge of the relationship between the wide time interval and the narrow time interval in subsequent time intervals of the incoming signal 300 comprising the first signal from the first user equipment 110. Searching and analysing a wide time interval requires considerably more processing power than searching a narrow time interval. Therefore a considerably more advanced analysis or search can be performed requiring considerably more processing power since the processing power only is required for the narrow time interval. This is very advantageous. The analysis is even more effective if the second signal is washed or mitigated away from the incoming signal 300 in optional step 406.

In some embodiments the analysis is performed on a wider interval. In these embodiments the identified knowledge of the first narrow time interval 310 used but a time interval is added to the first narrow time interval 310. In this way the "wider" second narrow time interval analysed is equal to the first narrow time interval 310 plus the additional time interval. This is because of potential first user equipment 110 mobility the between the wide time intervals 305, 340 resulting in either a time advance or a time delay in relation to the second narrow time interval 345.

By means of the analysis it may be detected that the possible service access request message or preamble thereof of the first signal is a real service access request message or preamble thereof. In some embodiments the first signal is detected as being a real service access request message or preamble thereof when the energy of the first signal exceeds a predetermined second threshold value, when searching the second narrow time interval 345. In some embodiments the first threshold value used when searching the first wide time interval 305 is higher then the second threshold value used when searching the second narrow time interval 345. A significant lower second threshold value may be used since only a narrow time interval is searched. That is very advantageous. Using a significant lower second threshold value makes it easier to detect if a possible message is a real message. The narrow time interval search may be based on more advanced processing, for example specific channel estimation.

408. The base station 100 may then send an acknowledgement to the first user equipment 110 when the real service access request message or preamble thereof is detected.

409. In some embodiments the detected real service access request message or preamble thereof is sent to the radio network controller 130 comprised in the radio communications network.

Furthermore a service access request message or preamble thereof such as a RACH message may also be stored and decoded after interference cancellation for better decoding performance, but at the cost of a delayed detection. The power offset Pp-m between the last preamble power and the power of the RACH message part needs to be adapted to the selected random access procedure.

The cancellation stages may use decided symbols, channel estimates and quality values/estimates from multiple receivers either situated in the same processing unit or in different processing units. Similarly, the cancellation stages may use completely regenerated signals or other information formats from the receivers. Furthermore, it could be sufficient to cancel the E-DCH which most probably dominates the uplink RoT.

The cancellation may utilize interference washers. It is advantageously if the regenerated signals are adequately delayed in order to be synchronized to the incoming signal 300. The washer may employ partial cancellation meaning that only a fraction of the regenerated interference is cancelled. This may be based on a quality value obtained from the receiver indicating the accuracy of the detected symbols and the channel estimates, i.e. the expected correctness probability of the regenerated signal.

In some embodiments cancellation is only performed of the RACH message part, while the preamble is detected without cancelled interference. In such a case the power offset Pp-m between the last preamble power and the power of the RACH message part can be reduced, and the maximal power allowed for the preamble can be higher than normal.

The required aggressive preamble threshold depends on the narrow time interval search preamble detection performance.

Figure 5:
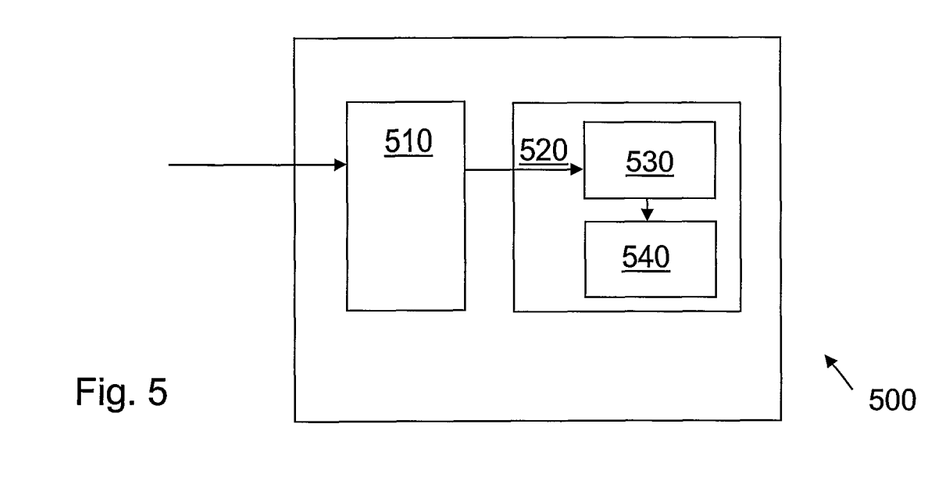
FIG. 5 is a schematic block diagram illustrating embodiments of an arrangement in a base station.

To perform the method steps for handling a request from the first user equipment 110 for accessing a service in a radio communications network, the base station 100 comprises an arrangement 500 depicted in FIG. 5.

The base station arrangement 500 comprises a receiving unit 510 adapted to receive a first wide time interval 305 of the incoming signal 300. The incoming signal 300 comprises a first signal sent from the first user equipment 110. The first signal extends along a first narrow time interval 310 being a part of the first wide time interval 305. The first signal is a possible service access request message.

The base station arrangement 500 further comprises a processing unit 520 comprising an analysing unit 530 adapted to, analyse the incoming signal 300 by searching the first wide time interval 305. The analysing unit 530 is further adapted to detect the first signal as being a possible service access request message.

The processing unit 520 further comprises an identification unit 540 being adapted to identify how the first narrow time interval 310 relates to the first wide time interval 305. The relationship will be the same for subsequent time intervals of the incoming signal 300 comprising the first signal from the first user equipment 110.

In some embodiments the base station 100 is adapted to communicate with a second user equipment 120, 121, 122, 123, 124 over a radio link. In these embodiments the incoming signal 300 further comprises a second signal sent from the second user equipment 120, 121, 122, 123, 124.

In some embodiments the processing unit 520 further is adapted to make a delay of the incoming signal 300.

In some embodiments the identification unit 540 further is adapted to, during the delay, identify the second signal comprised in the incoming signal 300.

The processing unit 520 may further comprise a diminishing unit 550 adapted to, during the delay wash or mitigate the identified second signal away from the incoming signal 300. The analysing unit 530 may further be adapted to perform the analysis by searching the first wide time interval 305 when the incoming signal 300 is washed or mitigated.

When using the word "comprise" or "comprising" it shall be interpreted as non-limiting, i.e. meaning "consist at least of".

The present invention is not limited to the above-describe preferred embodiments. Various alternatives, modifications and equivalents may be used. Therefore, the above embodiments should not be taken as limiting the scope of the invention, which is defined by the appending claims.

The invention claimed is:

1. A method in a base station for handling a request from a first user equipment for accessing a service in a radio communications network, the method comprising:

receiving a first wide time interval of an incoming signal, the first wide time interval comprising a first signal sent from the first user equipment and extending for a first narrow time interval, the first narrow time interval of the first signal comprising a first service access request message or preamble thereof;

analyzing the incoming signal by searching the first wide time interval and detecting that the first signal comprises the first service access request message or preamble thereof; and identifying a relationship between the first narrow time interval and the first wide time interval, for use in analyzing subsequent received intervals of the incoming signal.

2. The method of claim 1, wherein the base station communicates with at least one second user equipment over the radio link, and wherein the incoming signal further comprises a second signal sent from the at least one second user equipment, the method further comprising:

delaying the first wide time interval of the incoming signal; and, during the delay of the first wide time interval of the incoming signal, identifying all or part of the second signal and cancelling all or part of the second signal from the incoming signal;

wherein said analyzing of the incoming signal is performed after said cancelling.

3. The method of claim 1, wherein the first signal of the user equipment has a specific energy and wherein detecting that the first signal comprises the first service access request message or preamble thereof comprises detecting that the specific energy exceeds a predetermined first threshold value.

4. The method of claim 1, further comprising:
receiving a subsequent second wide time interval of the incoming signal, the second wide time interval comprising a second narrow time interval of the first signal, which second narrow time interval is a part of the second wide time interval and which second narrow time interval of the first signal comprises a second service access request message or preamble thereof, sent again from the first user equipment; and
further analyzing the incoming signal by searching the second narrow time interval, which second narrow time interval is found by using the identified relationship between the wide time interval and the first narrow time interval.

5. The method of claim 4, further comprising adding an additional time interval to the first narrow time interval to obtain a third narrow time interval that is wider than the second narrow time interval, wherein said further analyzing the incoming signal is performed on the third narrow time interval.

6. The method of claim 4, wherein the base station communicates with at least one second user equipment over the radio link, and wherein the incoming signal further comprises a second signal sent from the at least one second user equipment, the method further comprising:
delaying the second wide time interval of the incoming signal, and,
during the delay of the second wide time interval of the incoming signal, identifying all or part of the second signal and cancelling all or part of the second signal from the incoming signal;
wherein said further analyzing the incoming signal is performed after said cancelling.

7. The method of claim 4, wherein said further analyzing comprises detecting the second service access request message or preamble thereof.

8. The method of claim 7, and wherein detecting the second service access request message or preamble thereof comprises detecting that a specific energy of the first signal exceeds a second predetermined threshold value during the second narrow time interval.

9. The method of claim 8, wherein a first predetermined threshold value used when searching the first wide time interval is higher then the second predetermined threshold value used when searching the second narrow time interval.

10. The method of claim 7, further comprising:
sending an acknowledgement to the first user equipment when the second service access request message or preamble thereof is detected.

11. The method of claim 7, further comprising:
sending the detected second service access request message or preamble thereof to a radio network controller in the a radio communications network.

12. An arrangement in a base station for handling a request from a first user equipment for accessing a service in a radio communications network, the base station arrangement comprising:
a receiving unit adapted to receive a first wide time interval of an incoming signal, the first wide time interval comprising a first signal sent from the first user equipment and extending for a first narrow time interval, the first narrow time interval of the first signal comprising a first service access request message or preamble thereof;
a processing unit comprising an analyzing unit adapted to analyze the incoming signal by searching the first wide time interval and to detect that the first signal comprises the first service access request message or preamble thereof; and
the processing unit further comprising an identification unit adapted to identify a relationship between the first narrow time interval and the first wide time interval, for use in analyzing subsequent received intervals of the incoming signal.

13. The arrangement of claim 12, wherein the base station is adapted to communicate with a second user equipment over a radio link, wherein the incoming signal further comprises a second signal sent from the second user equipment, and wherein:
the processing unit is further adapted to delay the incoming signal;
the identification unit is further adapted to, during the delay, identify the second signal in the incoming signal;
the processing unit further comprises a diminishing unit adapted to, during the delay, cancel all or part of the identified second signal from the incoming signal; and
the analyzing unit is further adapted to analyze the incoming signal after the incoming signal is washed or mitigated.

* * * * *

UNITED STATES PATENT AND TRADEMARK OFFICE
CERTIFICATE OF CORRECTION

PATENT NO. : 8,428,631 B2  
APPLICATION NO. : 12/666961  
DATED : April 23, 2013  
INVENTOR(S) : Hagerman et al.

Page 1 of 1

It is certified that error appears in the above-identified patent and that said Letters Patent is hereby corrected as shown below:

In the Specification:

In Column 9, Line 4, delete "higher then" and insert -- higher than --, therefor.

In the Claims:

In Column 12, Line 1, in Claim 9, delete "higher then" and insert -- higher than --, therefor.

In Column 12, Line 10, in Claim 11, delete "the a radio" and insert -- a radio --, therefor.

Signed and Sealed this
Eighth Day of October, 2013

Teresa Stanek Rea
*Deputy Director of the United States Patent and Trademark Office*